United States Patent Office 2,927,120
Patented Mar. 1, 1960

2,927,120

METHOD OF PREPARING 3α-ACETOXY-17α-HYDROXY ETIOCHOLANE-11-ONE

Julien Warnant, Neuilly-sur-Seine, and Robert Joly, Montmorency, France, assignors to Les Laboratoires Francais de Chimiotherapie, Paris, France, a French body corporate No Drawing. Application February 11, 1958
Serial No. 714,470

Claims priority, application France February 12, 1957

2 Claims. (Cl. 260—397.45)

This invention relates to trisubstituted derivatives of etiocholane and to a method of preparing same.

More particularly, the present invention relates to a method of preparing 3α-acetoxy 17-hydroxy etiocholane 11-one in two stereoisomeric forms, 3α-acetoxy 17α-hydroxy etiocholane 11-one, II, and 3α-acetoxy 17β-hydroxy etiocholane 11-one III. The Roman numerals indicated after the chemical names represent the formulas hereinafter given.

These compounds have interesting physiological and pharmacodynamic properties, and may also serve as intermediate products in the preparation of the corresponding 11α- or 11β-hydroxylated derivatives.

The process according to the invention consists in decomposing the 20-dihydroperoxide of 3α-acetoxy pregnane 11,20-dione, I, by the action of either heat or ultraviolet rays in the presence of a solvent, such as methanol, ethanol and the like or by combining the action of heat with the action of the ultraviolet rays in order to accelerate the reaction.

The following equation illustrates the reaction of the method herein

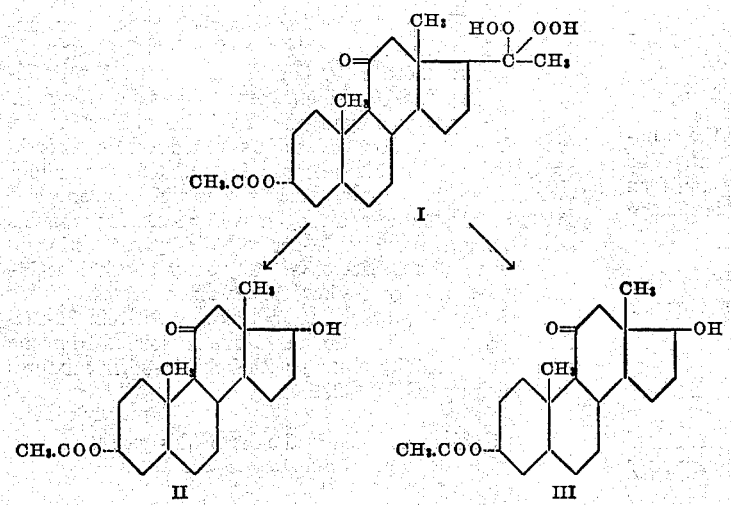

In United States patent application entitled "New Derivatives of Ketosteroids and Method of Preparing Same" filed June 6, 1957, Serial No. 663,880, now Patent No. 2,842,544, the applicants have described the preparation of the 20-dihydroperoxide of 3α-acetoxy pregnane 11,20-dione, I, by the action of anhydrous hydrogen peroxide in an organic solvent on 3α-acetoxy pregnane 11,20-dione.

It has now been found that, in the presence of certain solvents such as methanol, or ethanol and the like, the action of heat or ultraviolet rays causes decomposition of the dihydroperoxide, said decomposition becoming more rapid as one approaches the boiling point of the solvent used, the process being accelerated by the simultaneous supply of the two forms of energy. The products which form, in the course of the reaction are, on the one hand, mainly 3α-acetoxy pregnane 11,20-dione which can again be converted into the starting dihydroperoxide, on the other hand, the reaction produces an acid fraction and a mixture of 3α-acetoxy 17α-hydroxy etiocholane 11-one, II, of 3α-acetoxy 17β-hydroxy etiocholane 11-one, III, and of 3α-acetoxy etiocholane 11-one. These last three compounds can be separated easily by chromatography.

The reaction may be followed by the dosage of the active oxygen of the dihydroperoxide introduced. The reaction is terminated when the same has disappeared.

With the above features in mind, it is an object of the present invention to provide a method of preparing derivatives of etiocholane.

Another object of the present invention is to prepare stereoisomers of 3α acetoxy 17-hydroxy etiocholane 11-one.

A further object of the present invention is to prepare stereoisomers of 3α-acetoxy 17 hydroxy etiocholane 11-one having physiological and pharmacodynamic properties and which are useful in the preparation of their corresponding 11α or 11β hydroxylated derivatives.

A specific object of the present invention is to provide 3α acetoxy 17α hydroxy etiocholane 11-one.

Another specific object of this invention is to provide 3α acetoxy 17β hydroxy etiocholane 11-one.

With the above and other objects and features in view, the preferred method of carrying out the process of the present invention, consequently, consists in causing a mixture of dihydroperoxide, I, and methanol or ethanol to boil while under the influence of ultraviolet irradiation until compound I has disappeared. On to cooling, a portion of the 3α-acetoxy pregnane 11,20-dione that has formed, crystallizes. After evaporation to dryness, the mother liquors of crystallization are taken up with a neutral solvent which is immiscible with water, and then freed from the acid fraction that has formed by washing with a mild alkaline substance such as sodium bicarbonate. The resulting neutral fraction obtained is then subjected to treatment with the reagent T of Girard, which makes it possible to recover another fraction of crystallized 3α-acetoxy pregnane 11,20-dione. It is to be noted that the etiocholane compounds, having only one ketone group at the 11-position, which does not react with the reagent T, behave like non-ketone compounds. It is sufficient to subject this fraction which has not reacted with the reagent T to a chromatographic treatment in order to separate the desired compounds marked respectively, II and III above.

In the following example which serves to illustrate the invention without however limiting its scope, it is possible to change the nature of the solvent and the temperature, to heat without irradiating or to irradiate without heating, or to carry out at once a separation by chromatography of the reaction mixture without thereby exceeding the scope of the invention. In the description herein given, melting points are instantaneous melting points determined on the Maquenne block.

EXAMPLE

*Preparation of 3α-acetoxy 17-hydroxy etiocholane 11-one in its two stereoisomeric forms, Formulas II and III*

50 g. of dihydroperoxide, I, are suspended in 1500 cc. of methanol. While irradiating the suspension such as by means of two ultraviolet Hanau S.80 lamps and stirring the suspension mechanically, it is heated to boiling under reflux, until starch-iodide paper applied for testing no longer reveals the presence of active oxygen. This treatment takes about 9 hours. The solution is then cooled and concentrated in vacuo at a low temperature to about one seventh of its starting volume, and then cooled to −10° C. Crystallization is allowed to proceed for about one hour, and the crystals that have formed are separated by filtration or centrifugation and washed with methanol and then dried.

This method produces 15 g. of 3α-acetoxy pregnane 11, 20-dione. After the mother liquors of crystallization have been evaporated to dryness, the residue is then dissolved in ether and the acid fraction is eliminated by washing with an aqueous solution saturated with sodium bicarbonate or other suitable mild alkaline agent. The ethereal extract is then washed with water, then dried over magnesium sulfate and evaporated to dryness in vacuo. The residue thus obtained is treated, under the usual conditions, with an equal weight of the Girard T reagent. This produces, on the one hand, an aqueous solution of T hydrazones which, by acidification, again yields 10 g. of 3α-acetoxy pregnane 11,20-dione bringing the total of the compound recovered or produced to 50% by weight of the initial dihydroperoxide, and, on the other hand, an ethereal extract comprising the products which have not combined with the T reagent. The neutral ethereal extract is evaporated to dryness and then taken up with 600 cc. of cyclohexane. Filtering is effected to eliminate an insoluble product or solid and chromatography is carried out over alumina.

The alumina is then eluted with benzene, then benzene-ether mixtures with the following ether contents 1%, 2%, 5%, 10%, 20% and 50%.

The benzene eluate yields, after evaporation of the solvent and recrystallization in methanol, 3α-acetoxy etiocholane 11 - one, having a M. P. = 130° C., $[\alpha]_D^{20}=+74°$ C. (c.=0.5%, acetone), which has previously been described in the French Patent No. 1,173,938.

The first benzene-ether eluates containing up to 10% of ether produce, after evaporation to dryness, 2 g. of 3α-acetoxy 17α-hydroxy etiocholane 11-one, II. After recrystallization in methanol, there is obtained a product having a M.P.=172° C., $[\alpha]_D^{20}=+80°$ C.±3 (c.=0.5% acetone). This product occurs in the form of colorless needles, is slightly soluble in acetone and alcohol, insoluble in ether and water. It has a definite cardiotonic effect.

The analysis of this product shows a formula of $C_{21}H_{32}O_4$ and a molecular weight of 348.47. As calculated: C=72.38%, H=9.26%, O=18.37%. As found: C=72.1%, H=9.2%, O=18.6%.

This compound has not been described in the past.

By chromic acid oxidation it yields 3α-acetoxy etiocholane 11,17-dione, M.P. 162° C., which is known in the art.

The benzene-ether washings from 20% to 50% of ether yield, by evaporation to dryness, 3α-acetoxy 17β-hydroxy etiocholane 11-one, III, having a M.P. 175° C., which is new and has not been described in literature heretofore, and which also yields, by chromic acid oxidation, 3α-acetoxy etiocholane 11,17-dione, M.P. 162° C.

Its analysis shows the formula $C_{21}H_{32}O_4$ with a molecular weight of 348.47. As calculated: C=72.38%, H=9.26%, O=18.37%. As found: C=72.4%, H=9.2%, O=18.6%.

From the foregoing description taken in conjunction with the accompanying illustrative example, it will be noted that there is provided a new method of forming new derivatives of etiocholane which have valuable uses in physiology, pharmacodynamics and biochemistry.

While a preferred method and new products have been described, it is to be understood that changes as to steps or procedure or use of materials may be made without departing from the spirit and scope of the invention as claimed.

We claim:

1. In a process of preparing 3α-acetoxy-17-hydroxy etiocholane-11-one in its stereo-isomeric forms, the steps which comprise heating to boiling under reflux a suspension of the dihydroperoxide of 3α-acetoxy-pregnane-11,20-dione in a lower alkanol while exposing the suspension to the action of ultraviolet rays, until the dihydroperoxide has disappeared therefrom, cooling the reaction mixture to cause crystallization of 3α-acetoxy pregnane-11,20-dione, separating said crystallized 3α-acetoxy pregnane-11,20-dione from the mother liquor, removing acid by-products from the mother liquor by washing with an alkali metal bicarbonate solution, reacting the washed mother liquor with Girard's reagent T to cause formation of the Girard's hydrazone T with 3α-acetoxy pregnane-11,20-dione, separating said hydrazone from the unreacted components of the mother liquor, subjecting a solution of said unreacted components in cyclohexane to a chromatographic treatment over alumina, eluting the alumina successively with benzene and mixtures of benzene and progressively increasing amounts of ether, and isolating 3α-acetoxy-17α-hydroxy etiocholane-11-one and 3α-acetoxy-17β-hydroxy etiocholane-11-one by evaporation of the benzene-ether eluates.

2. The process according to claim 1, wherein 3α-acetoxy-17α-hydroxy etiocholane-11-one is isolated from the eluates obtained by eluting with benzene-ether mixtures containing up to 10% of ether.

References Cited in the file of this patent

UNITED STATES PATENTS 2,771,467   Magerlein et al. _____ Nov. 20, 1956
2,842,544   Warnant et al. _____ July 8, 1958

OTHER REFERENCES

Fieser: Natural Products Related to Phenanthrene, 1949, page 402.